United States Patent
Brown et al.

(10) Patent No.: US 10,457,882 B2
(45) Date of Patent: Oct. 29, 2019

(54) METHODS OF PRODUCING SOLID FUEL USING LOW ASH, LOW SULFUR COAL REPLACEMENT FROM FAST PYROLYSIS OF BIOMASS

(71) Applicant: Iowa State University Research Foundation, Inc., Ames, IA (US)

(72) Inventors: Robert C. Brown, Ames, IA (US); Marjorie Rover, Ames, IA (US); Andrew J. Friend, Boone, IA (US); Ryan G. Smith, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 176 days.

(21) Appl. No.: 15/589,095

(22) Filed: May 8, 2017

(65) Prior Publication Data
US 2017/0321140 A1  Nov. 9, 2017

Related U.S. Application Data

(60) Provisional application No. 62/332,750, filed on May 6, 2016.

(51) Int. Cl.
*C10L 7/04* (2006.01)
*C10L 9/08* (2006.01)
(Continued)

(52) U.S. Cl.
CPC .................. *C10L 7/04* (2013.01); *C10L 5/28* (2013.01); *C10L 5/40* (2013.01); *C10L 5/42* (2013.01); *C10L 5/442* (2013.01); *C10L 5/445* (2013.01); *C10L 5/447* (2013.01); *C10L 5/46* (2013.01); *C10L 5/48* (2013.01); *C10L 7/02* (2013.01);
(Continued)

(58) Field of Classification Search
CPC .... C10L 7/04; C10L 5/447; C10L 7/02; C10L 5/48; C10L 5/46; C10L 9/08; C10L 5/445; C10L 5/442; C10L 5/42; C10L 5/40; C10L 5/28; C10L 2290/28; C10L 2290/544; C10L 2290/02; C10L 2290/24; C10L 2290/06;
(Continued)

(56) References Cited

U.S. PATENT DOCUMENTS

| | | | |
|---|---|---|---|
| 8,992,736 B2 | 3/2015 | Daugaard et al. | |
| 2010/0325942 A1* | 12/2010 | Eriksson | C10L 1/322 44/307 |
| 2015/0069646 A1* | 3/2015 | Michalakos | C04B 35/521 264/29.5 |

FOREIGN PATENT DOCUMENTS

| | | | | |
|---|---|---|---|---|
| CN | 103396820 A | * | 11/2013 | |
| CN | 103540379 A | * | 1/2014 | |
| WO | WO-2014201185 A2 | * | 12/2014 | C08G 65/2603 |

OTHER PUBLICATIONS

Lindfors et al., "Fractionation of Bio-Oil," Energy Fuels 28:5785-5791 (2014).

* cited by examiner

*Primary Examiner* — Pamela H Weiss
(74) *Attorney, Agent, or Firm* — Pepper Hamilton LLP

(57) ABSTRACT

The present invention is directed to a method of producing a solid fuel which includes providing a bio-oil and thermally curing the bio-oil to form a carbonaceous solid. The present invention is also directed to a method of producing a solid fuel which includes providing a bio-oil; subjecting the bio-oil to an extraction procedure with an aqueous liquid to produce a concentrated pyrolytic sugar-containing extract
(Continued)

and a water insoluble raffinate comprising a lignin-derived phenolic oil; and thermally curing the phenolic oil to form a carbonaceous solid.

15 Claims, 4 Drawing Sheets

(51) Int. Cl.
*C10L 7/02* (2006.01)
*C10L 5/48* (2006.01)
*C10L 5/46* (2006.01)
*C10L 5/44* (2006.01)
*C10L 5/42* (2006.01)
*C10L 5/40* (2006.01)
*C10L 5/28* (2006.01)

(52) U.S. Cl.
CPC ......... *C10L 9/08* (2013.01); *C10L 2200/0469* (2013.01); *C10L 2290/02* (2013.01); *C10L 2290/06* (2013.01); *C10L 2290/24* (2013.01); *C10L 2290/28* (2013.01); *C10L 2290/544* (2013.01); *Y02E 50/10* (2013.01); *Y02E 50/30* (2013.01)

(58) Field of Classification Search
CPC ... C10L 2200/0469; Y02E 50/30; Y02E 50/10
See application file for complete search history.

| # | Name | Time [Min] | Quantity [wt. %] | Height [uV] | Area [uV.Min] | Area % [%] |
|---|------|------------|------------------|-------------|---------------|------------|
| 1 | Methanol (diluent) | 6.52 | 0.00 | 2559530.9 | 1785304.6 | 100.000 |

METHODS OF PRODUCING SOLID FUEL USING LOW ASH, LOW SULFUR COAL REPLACEMENT FROM FAST PYROLYSIS OF BIOMASS

This application claims the benefit of U.S. Provisional Patent Application Ser. No. 62/332,750, filed May 6, 2016, which is hereby incorporated by reference in its entirety.

FIELD OF THE INVENTION

The present invention is directed to methods of producing a solid fuel. The present invention produces a low ash, low sulfur coal replacement from fast pyrolysis of biomass.

BACKGROUND OF THE INVENTION

Ever increasing energy use has caused dependence on fossil fuels (i.e. coal, oil, natural gas) and a substantial increase in greenhouse gas emissions: considered to be the root cause of global climate change (McIlveen-Wright et al., "A Technical and Economic Analysis of Three Large Scale Biomass Combustion Plants in the UK," *Applied Energy* 112:396-404 (2013) and Agbor et al., "Integrated Techno-Economic and Environmental Assessments of Sixty Scenarios for Co-Firing Biomass with Coal and Natural Gas," *Applied Energy* 169:433-449 (2016)). The goal to reduce greenhouse gas emissions levels has led to increased interest in biomass use (Agbor et al., "Integrated Techno-Economic and Environmental Assessments of Sixty Scenarios for Co-Firing Biomass with Coal and Natural Gas," *Applied Energy* 169:433-449 (2016)).

Coal is one of the most important energy resources worldwide (Zhou et al., "Kinetic Study on CO2 Gasification of Brown Coal and Biomass Chars: Reaction Order," *Fuel* 173:311-319 (2016) and Pei et al., "Investigation of the Feasibility of Underground Coal Gasification in North Dakota, United States," *Energy Conversion and Management* 113:95-103 (206)). However, combustion of coal releases a number of air pollutants and coal mining leads to safety issues, contamination of groundwater, surface pollution, and greenhouse gas emissions. Coal combustion releases chiefly sulfur dioxide ($SO_2$), nitrogen oxides ($NO_x$), mercury, and particulate matter, as well as other pollutants. It is also a major source of greenhouse gas emissions into the atmosphere, predominantly as carbon dioxide (International Energy Agency, Reducing Greenhouse Gas Emissions: The Potential of Coal, in: Organisation for Economic Cooperation and Development, Paris, France (2005)). Solid waste disposal relies on significant land use. The efficiency of most pulverized coal power plants is less than 40% (Pei et al., "Investigation of the Feasibility of Underground Coal Gasification in North Dakota, United States," *Energy Conversion and Management* 113:95-103 (2016)).

Pulverized coal power plants face two issues that must be addressed. The first is that low rank coal, accounting for half of the world coal reserves, should be blended with bituminous coal. This blending is deemed necessary, because low rank coal decreases the efficiency of power plants, as well as resulting in an increase in $CO_2$ emissions, because of the high moisture content (25-75 wt %). Moisture leads to more than a 20% increase in the $CO_2$ emission in comparison to bituminous coal (Traa, Y., "Is a Renaissance of Coal Imminent?-Challenges for Catalysis," *Chemical Communications* 46:2175-2187 (2010); Li et al., "Pyrolysis and Combustion Characteristics of an Indonesian Low-Rank Coal Under $O_2/N_2$ and $O_2/CO_2$ Conditions," *Energy & Fuels* 24:160-164 (2010); and Lee et al., "Two-in-One Fuel Combining Sugar Cane with Low Rank Coal and Its $CO_2$ Reduction Effects in Pulverized-Coal Power Plants," *Environmental Science & Technology* 47:1704-1710 (2013)). The second issue facing coal power plants is compliance with the renewable portfolio standards (RPS) and the cap-and-trade system implemented in many countries (Lee et al., "Two-in-One Fuel Combining Sugar Cane with Low Rank Coal and Its $CO_2$ Reduction Effects in Pulverized-Coal Power Plants," *Environmental Science & Technology* 47:1704-1710 (2013)).

Co-firing biomass with coal has the potential to reduce most of these emissions (Agbor et al., "Integrated Techno-Economic and Environmental Assessments of Sixty Scenarios For Co-Firing Biomass With Coal and Natural Gas," *Applied Energy* 169:433-449 (2016)). However, co-firing has several operational disadvantages (Agbor et al., "A Review of Biomass Co-Firing in North America," *Renewable and Sustainable Energy Reviews* 40:930-943 (2014)). Its lower bulk density and high moisture content, compared to coal, results in higher transportation costs. Differences in physical properties complicate direct blending of biomass with coal, making necessary separate storage, handling and feeding of biomass. The lower heating value and moisture content of biomass compared to coal results in boiler derating. Relatively high values of alkali exacerbate ash fouling while some forms of biomass contain high levels of chlorine, which increases corrosion of boiler tubes. Finally, the composition of ash in biomass is distinct from coal ash and may not meet ASTM specifications for concrete applications. Accordingly, co-firing can increase the cost of ash disposal.

The present invention is directed to overcoming the difficulties found in the art.

SUMMARY OF THE INVENTION

The present invention is directed to a method of producing a solid fuel. The method includes providing a bio-oil and thermally curing the bio-oil to form a carbonaceous solid.

The present invention is also directed to a method of producing a solid fuel which includes providing a bio-oil; subjecting the bio-oil to an extraction procedure with an aqueous liquid to produce a concentrated pyrolytic sugar-containing extract and a water insoluble raffinate comprising a lignin-derived phenolic oil; and thermally curing the phenolic oil to form a carbonaceous solid.

The goal of the present invention is to mitigate the issues at the forefront of the coal industry while utilizing the existing coal material handling and processing infrastructure. Lignin derived bio-oil potentially can be used as a replacement for coal and wood pellets.

Significant potential exists for co-firing coal with lignin derived bio-oil, produced by the thermochemical conversion of biomass through fast pyrolysis, after it has been heat treated (i.e., cured) or using the heat treated lignin derived bio-oil as 100% replacement to coal. This bio-oil product also has potential to be utilized as a replacement to wood pellets in power generation.

Bio-oil produced from fast pyrolysis process of biomass provides a source of lignin-derived oligomers. One route to convert lignocellulosic biomass to produce chemicals and fuels that has gained serious attention more recently is a fast pyrolysis platform. Fast pyrolysis is the rapid thermal decomposition of organic compounds in the absence of oxygen to produce liquids, gases, and chars. The distribution of products depends on the biomass composition, particle size, and rate and duration of heating. Liquid yields as high as 78% are possible. The liquid product can substitute for fuel oil in static heating or electricity generation application. In addition, the liquid can also be used to produce a range of specialty and commodity chemicals, such as levoglucosene, fertilizers, and hydrogen. Depending on its original lignocellulosic biomass source, bio-oil contains between 10 to 30% lignin-derived oligomers by weight.

In one example of a fast pyrolysis process, biomass is heated rapidly in a high temperature environment, yielding a mix of liquid fuel (bio-oil), combustible gases, and solid char. Pyrolysis is an independent conversion technology, as well as a part of the gasification process. Gasification can be separated into two main stages: 1) solid devolatilization (pyrolysis) and 2) char conversion (combustion and gasification). Fast pyrolysis converts biomass into liquid form, which has higher bulk density and heating value, thus it is easier and more economical to store and/or transport compared to the bulky biomass. The liquid product resulting from biomass pyrolysis is commonly referred to as "pyrolysis oil," "bio-fuel oil," or simply "bio-oil."

Bio-oil has many advantages in comparison to co-firing biomass with coal; it simplifies transportation and processing and is essentially carbon neutral and energy dense. Bio-oil from most biomass feedstocks is naturally low in sulfur and nitrogen. Therefore, it would lower $SO_2$ and $NO_x$ emissions. Utilizing lignin derived bio-oil does not require sizable capital input, because existing coal infrastructure can be applied. If co-fired, the bio-oil can be ground to the same size requirements for coal and fed into the boiler. If being co-processed, it can be ground with coal in the same mill and then fed into the boiler (Friend, A. J., "Co-Fire Pellets" for Emissions Reduction and Renewable Energy Generation," in *Energy-Tech*, WoodwarBizMedia, pp. 6-10 (2012) and Friend, A. J., "Development of a Co-Firing Fuel from Biomass-Derived Binder and Crushed Coal," in *Mechanical Engineering*, Iowa State University, p. 118 (2013), which are hereby incorporated by reference in their entirety). If utilizing the heat treated lignin derived bio-oil as a replacement to coal, it can be ground to the size requirements and directly fed into the boiler.

The present invention develops a biomass-derived solid fuel known as Lignocol that can reduce sulfur and nitrogen emissions from coal-fired power plants without suffering the ash fouling and loss of boiler capacity usually associated with co-firing biomass. To produce Lignocol, lignocellulosic biomass was pyrolyzed to vapors that were condensed as distinct fractions of bio-oil. Heavy fractions of bio-oil, consisting primarily of anhydrosugars from holocellulose and phenolics from lignin in the biomass, were subjected to a water extraction to produce separate streams of water-insoluble phenolics and water-soluble sugars. The phenolics were cured at 105-220° C. to evaporate water and expedite cross-linking reactions that solidified the phenolic liquid into Lignocol. The higher heating value (HHV) and particle density of Lignocol were similar to several commercially significant coals in the United States while the nitrogen and sulfur contents were only 0.26 wt % and 0.02 wt %, respectively, much lower than typically found in coal. The ash content of Lignocol was less than 0.5 wt % compared to 3-10 wt % for coals. Lignocol was structurally stable in the presence of water and only leached 8.52 ppm and 9.03 ppm of aromatics at pH 4.2 and 5.0, respectively. Lignocol was combusted at 650° C. in a 100 g/hour fluidized bed reactor to determine feeding characteristics. Neither melting in the feeder system nor agglomeration in the reactor were observed. Based on these observations, Lignocol has excellent and unexpected prospects for high levels of co-firing with coal in power plants and replacing wood pellets in dedicated biomass firing while avoiding the usual challenges of burning biomass.

The present invention proposes mitigating the problems of burning biomass by first processing it into solid fuel known as Lignocol that has potential to dramatically reduce moisture and ash content while increasing fuel density and heating value compared to raw biomass. Lignocellulosic biomass is subjected to fast pyrolysis to produce bio-oil, biochar, and non-condensable gases (Brown et al., "Thermochemical Processing of Biomass Conversion into Fuels," *Chemicals and Power*, Hoboken:Wiley (2011), which is hereby incorporated by reference in its entirety). The bio-oil is fractionated into several streams including heavy fractions consisting of a mixture of phenolic oil derived from lignin in the biomass and sugars from plant polysaccharides (Rover et al., "The Effect of Pyrolysis Temperature on Recovery of Bio-Oil as Distinctive Stage Fractions," *Journal of Analytical and Applied Pyrolysis* 105:262-268 (2014), which is hereby incorporated by reference in its entirety).

A simple liquid-liquid extraction separates the phenolic oil from the sugar. The phenolic oil, a viscous reactive liquid, is cured to solid Lignocol. The biochar, representing 12-15 wt % of the pyrolysis products, is a carbonaceous solid that could also be used as boiler fuel. However, because much of the original ash in the biomass reports to the biochar, it might be more productively used as soil amendment where these inorganic compounds, especially the potassium and phosphorous, serve as plant nutrients (Lehmann et al., "Biochar for Environmental Management: Science, Technology and Implementation," Routledge (2015), which is hereby incorporated by reference in its entirety) and the carbon serves as carbon sequestration agent (Laird et al., "Review of the Pyrolysis Platform for Coproducing Bio-Oil and Biochar," *Biofuels, Bioproducts and Biorefining* 3:547-562 (2009), which is hereby incorporated by reference in its entirety).

The present invention investigates the properties of Lignocol as a solid boiler fuel and compares them to those of several types of coals in the United States. Red oak, high lignin content biomass, was pyrolyzed in a continuous, 8 kg/h process development unit to produce bio-oil fractions from which the phenolic oil was separated and cured into Lignocol. A wide range of properties were evaluated including density, heating value, elemental and proximate analysis, trace element composition, grindability, stability and leaching when exposed to water, and combustion behavior.

DETAILED DESCRIPTION OF THE INVENTION

Figure 1:
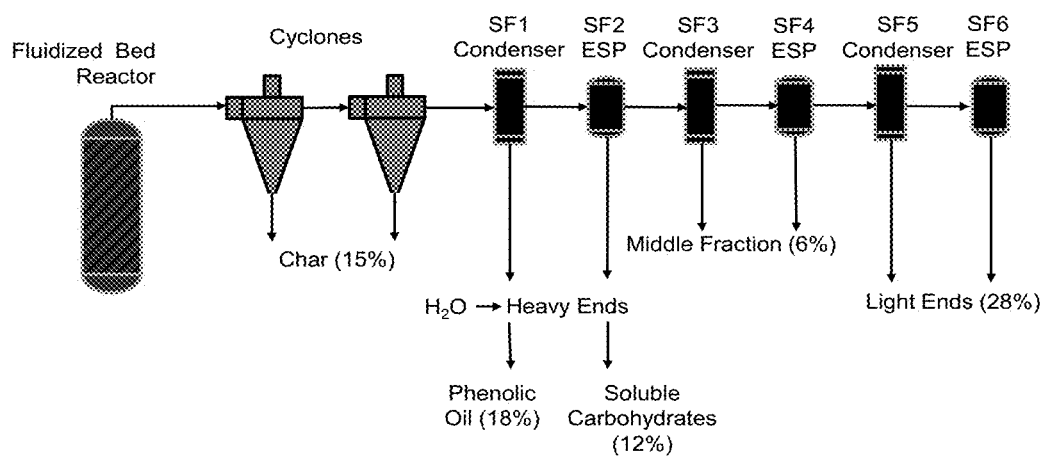
FIG. 1 shows a schematic of the fast pyrolysis process development unit and separations process used to produce bio-oil for the production of the solid fuel of the present invention (i.e., Lignocol).

A first aspect of the present invention is directed to a method of producing a solid fuel. The method includes providing a bio-oil and thermally curing the bio-oil to form a carbonaceous solid.

A second aspect of the present invention is directed to a method of producing a solid fuel which includes providing a bio-oil; subjecting the bio-oil to an extraction procedure with an aqueous liquid to produce a concentrated pyrolytic sugar-containing extract and a water insoluble raffinate comprising a lignin-derived phenolic oil; and thermally curing the phenolic oil to form a carbonaceous solid.

The methods of the present invention can be used to treat "bio-oil" which includes "whole bio-oil" and a "bio-oil fraction." The bio-oil can be a whole or crude bio-oil recovered directly from pyrolysis of a biomass. Whole bio-oil is generally an emulsion of lignin-derived phenolic monomers and oligomers in an aqueous phase that dissolves mostly carbohydrate-derived compounds. Sufficient addition of water to whole bio-oil will cause the lignin-derived phenolic compounds to precipitate from the bio-oil to form what is sometimes called pyrolytic lignin. Bio-oil fractions can be recovered from the pyrolysis vapor stream leaving a pyrolysis reactor by controlling the temperature of the condensing process. This produces a heavy fraction consisting of sugars/anhydrosugars and phenolic monomers and oligomers that is separately recovered from a light fraction consisting of water and low molecular weight compounds such as carboxylic acids, aldehydes, ketones, and alcohols. The lignin-derived phenolic oligomers in the heavy fraction can be separated from the sugars/anhydrosugars using a simple water extraction. Both the phenolic compounds recovered as pyrolytic lignin from whole bio-oil and from the heavy fraction of fractionating recovery of bio-oil are suitable feedstocks for production of solid fuel of the present invention (i.e., Lignocol). The bio-oil fraction may be recovered from the pyrolysis of a biomass at different stages. Bio-oil fractions can be recovered from the product of a biomass at different stages, such as stage fraction 1 (SF1), stage fraction 2 (SF2), stage fraction 3 (SF3), stage fraction 4 (SF4), stage fraction 5 (SF5), or combinations thereof. The components in the different stage fractions are described infra.

Bio-oil can be obtained from a variety of biomass types. Biomass is biological material from living, or recently living organisms. Biomass can be in the form of products, by-products, and/or residues of the forestry and agriculture industries. Biomass includes, but is not limited to, forest and mill residues, agricultural crops and wastes, wood and wood wastes, animal wastes, livestock operation residues, aquatic plants, fast-growing trees and plants, and municipal and industrial wastes. The crop residues that can be used for the present invention include materials such as, e.g., corn stover. Lignocellulosic biomass, consisting of cellulose, hemicelluose, and lignin in various portions depending upon the source, is the structural plant material found in trees, grasses, and other terrestrial (non-aquatic) biomass. Examples include, but are not limited to red oak, oak wood, switch grass, and corn stover.

Bio-oil, the liquid product of fast pyrolysis (i.e., thermal deconstruction) of biomass, superficially resembles petroleum. Both are dark, viscous liquids consisting of hundreds of organic compounds. The superficial similarities between petroleum and bio-oil have encouraged efforts to employ petroleum hydroprocessing in the upgrading of bio-oil, which has had limited success. Rover et al., "Stabilization of Bio-Oils Using Low Temperature, Low Pressure Hydrogenation," *Fuel* 153:224-230 (2015), which is hereby incorporated by reference in its entirety.

Bio-oil is an emulsion of predominantly lignin-derived phenolic oligomers in an aqueous phase containing primarily carbohydrate-derived compounds (Mohan et al., "Pyrolysis of Wood/Biomass for Bio-Oil: A Critical Review," *Energy & Fuels* 20:848-889 (2006), which is hereby incorporated by reference in its entirety). Bio-oil has several characteristics that make it undesirable as fuel such as poor storage stability (A. V. Bridgwater, "Overcoming Barriers to Bioenergy: Outcomes of the Bioenergy Network of Excellence 2003-2009," *Biomass and Bioenergy*, 38: 68-94 (2012) and Busetto et al., "Application of the Shvo Catalyst in Homogeneous Hydrogenation of Bio-Oil Obtained From Pyrolysis of White Poplar: New Mild Upgrading Conditions," *Fuel* 90:1197-1207 (2011), which are hereby incorporated by reference in their entirety); high acidity and corrosivity (Busetto et al., "Application of the Shvo Catalyst in Homogeneous Hydrogenation of Bio-Oil Obtained From Pyrolysis of White Poplar: New Mild Upgrading Conditions," *Fuel* 90:1197-1207 (2011); Pham et al., "Evaluating Strategies for Catalytic Upgrading of Pyrolysis Oil in Liquid Phase," *Applied Catalysis B: Environmental*, 145: 10-23 (2014); Mortensen et al., "A Review of Catalytic Upgrading of Bio-Oil to Engine Fuels," *Applied Catalysis A: General*, 407: 1-19 (2011); and Mercader et al., "Pyrolysis Oil Upgrading by High Pressure Thermal Treatment," *Fuel* 89:2829-2837 (2010), which are hereby incorporated by reference in their entirety); low heating value, high viscosity, incomplete volatility (Busetto et al., "Application of the Shvo Catalyst in Homogeneous Hydrogenation of Bio-Oil Obtained From Pyrolysis of White Poplar: New Mild Upgrading Conditions," *Fuel* 90:1197-1207 (2011) and Czernik et al. "Overview of Applications of Biomass Fast Pyrolysis Oil," *Energy & Fuels* 18:590-598 2004), which are hereby incorporated by reference in their entirety); and immiscibility with petroleum fuels (Mohan et al., "Pyrolysis of Wood/Biomass for Bio-Oil: A Critical Review," *Energy & Fuels* 20:848-889 (2006) and Mercader et al., "Pyrolysis Oil Upgrading by High Pressure Thermal Treatment," *Fuel* 89:2829-2837 (2010), which are hereby incorporated by reference in their entirety).

Bio-oil can be recovered, for example, by fast pyrolysis of biomass. Pyrolysis is the thermochemical decomposition of biomass at elevated temperatures (typically around 300 to 550° C.) in the absence of oxygen. One method of obtaining bio-oil from fast-pyrolysis of biomass is described in Pollard et al., "Characterization of Bio-oil Recovered as Stage Fractions with Unique Chemical and Physical Properties," *J. Anal. Appl. Pyrolysis* 93: 129-139 (2012), which is hereby incorporated by reference in its entirety. It teaches a bio-oil recovery system that recovers bio-oil as distinctive stage fractions while eliminating many of the problems associated with traditional condenser based bio-oil recovery systems. When treated at these temperatures, biomass decomposes to three primary products: char, bio-oil, and gases (e.g., CO, $H_2$, $CO_2$, and $CH_4$).

Bio-oil is a mixture of water, light volatiles, and non-volatiles and is highly reactive because of the presence of significant quantities of oxygen. The bio-oil is a complex mixture of chemical species that result from the decomposition of cellulose, hemicellulose, and lignin. There are over 300 compounds, including, but not limited to, furans, minor carbohydrates, acetic acid, levoglucosan, water insoluble compounds, water, syringols, guaiacols, phenols, hydroxyaldehyde, hydroxyketones, solids, other sugars, and phenolic compounds. The abundance of these chemical species in bio-oil makes it attractive resource for obtaining chemicals and fuels.

Bio-oil contains 42-48 wt % oxygen (Oasmaa et al., "Fast Pyrolysis Bio-Oils from Wood and Agricultural Residues," *Energy & Fuels* 24:1380-1388 (2009) and Mohan et al., "Pyrolysis of Wood/Biomass for Bio-Oil: A Critical Review," *Energy & Fuels,* 20:848-889 (2006), which are hereby incorporated by reference in their entirety), which may be reduced by catalytic upgrading before co-feeding in a refinery unit to produce transportation fuels (Lappas et al., "Production of Biofuels via Co-processing in Conventional Refining Processes," *Catalysis Today* 145:55-62 (2009), which is hereby incorporated by reference in its entirety). Several other problems to direct upgrading of bio-oil includes high water content (15-30%), limited stability, and high acidity (Lappas et al., "Production of Biofuels via Co-processing in Conventional Refining Processes," *Catalysis Today* 145:55-62 (2009); Oasmaa et al., "Fuel Oil Quality of Biomass Pyrolysis Oils—State of the Art for the End User," *Energy & Fuels* 13:914-921 (1999); and Chiaramonti et al., "Power Generation using Fast Pyrolysis Liquids from Biomass," *Renew. Sust. Energy Rev.* 11:1056-1086 (2007), which are hereby incorporated by reference in their entirety).

The solid fuel of the present invention is produced by thermally curing bio-oil. The carbonaceous solid of the present invention can be further pulverized into a liquid or a powder. In one embodiment, the carbonaceous solid is pulverized into a liquid. In another embodiment, the carbonaceous solid is pulvervized into a powder. In one embodiment, the carbonaceous solid is pulverized at up to about 400 rpm for up to 30 minutes, and may optionally further include one minute intervals between five minute reverse rotation. In another embodiment, the liquid is cured directly to a powder without size reduction by using a drying tower.

The thermally curing step of the present invention may be carried at a temperature of, for example, 100° C., 105° C., 110° C., 115° C., 120° C., 125° C., 130° C., 135° C., 140° C., 145° C., 146° C., 147° C., 148° C., 149° C., 150° C., 151° C., 152° C., 153° C., 154° C., 155° C., 160° C., 165° C., 170° C., 175° C., 180° C., 185° C., 190° C., 195° C., 200° C., 205° C., 210° C., 215° C., 220° C. or any temperature in between. In one embodiment, the thermal curing is carried out at 105-220° C. for less than 3 hours. In another embodiment, mixing is carried out in a laboratory oven at 200° C. to 220° C. for two hours or less. Whichever temperature is used, it is adequate for the bio-oil to be thermally cured to form a carbonaceous solid.

The solid fuel may serve as a 100% replacement for alternative solid fuels including, but not limited to, wood, charcoal, peat, coal, Hexamine fuel tablets, and wood pellets. The solid fuel can be mixed with varying amounts of other solid fuels, for example, in amounts ranging from about 99% to about 1% solid fuel and from about 1% to about 99% alternative solid fuels. The solid fuel of the present invention may be a low ash, low sulfur, solid fuel. In one embodiment, the nitrogen and sulfur contents of the solid fuel of the present invention are 0.26 wt % and 0.02 wt %, respectively, which is much lower than typically found in coal. In one embodiment of the present invention, the ash content of solid fuel (i.e., Lignocol) was less than 0.5 wt % compared to 3-10 wt % for traditional coals. The solid fuel of the present invention (i.e., Lignocol) is, in one embodiment, structurally stable in the presence of water and may leach only 8.52 ppm and 9.03 ppm of aromatics at pH 4.2 and 5.0, respectively. The solid fuel of the present invention (i.e., Lignocol) has excellent and unexpected prospects for high levels of co-firing with coal in power plants and replacing wood pellets in dedicated biomass firing while avoiding the usual challenges of burning biomass.

The method of the present invention can use either whole bio-oil (as described supra) or the heavy fraction of fractionated bio-oil as feedstock for production of the solid fuel of the present invention (Lignocol). In one embodiment, the method uses a heavy fraction of fractionated bio-oil. The heavy fractions of fractionated bio-oil may be those described in U.S. Pat. No. 8,476,480 to Brown et al., which is hereby incorporated by reference in its entirety.

The first liquid fraction (SF1) (see FIG. 1) collected from crude bio-oil is high in water insolubles and anhydrosugars. This fraction is typically recovered in a condenser operated in accordance with U.S. Pat. No. 8,476,480 to Brown et al., which is hereby incorporated by reference in its entirety. There is also a small amount of water, between 3-7%. The percentage of water insoluble components can range from 25-75% (largely dependent on the biomass that was used). The water insolubles are thought to come from the lignin in the biomass. The first fraction of bio-oil also contains between 0-50% levoglucosan, a 6 carbon anhydrous sugar. The amount of levoglucosan is a function of biomass and reactor operating conditions.

The first liquid fraction as well as various other bio-oil fractions contain a variety of chemical species including, without limitation, furans, minor carbohydrates, acetic acid, levoglucosan, water insoluble compounds, water, syringols, guaiacols, phenols, hydroxyaldehyde, hydroxyketones, solids, other sugars, and phenolic compounds.

The first liquid fraction may have a weight percentage of between 1-50%, including but not limited to 1%, 5%, 10%, 15%, 20%, 25%, 30%, 35%, 40%, 45%, and 50%. The first liquid fraction may have a weight percentage of minor carbohydrates having a weight percentage in the range of between about 0 to 50% and acetic acid may have a weight percentage of between about 0 and 25%. The first liquid fraction may have a weight percentage of levoglucosan between about 0% to 99%, including, for example, 1%, 5%, 10%, 15%, 20%, 25%, 30%, 35%, 40%, 45%, 50%, 60%, 70%, 80%, 90%, and 99%. The first liquid fraction may have a weight percentage of water insoluble compounds between 0% to 75%, for example 25%-75%, and may have water in the weight percentage of 0%. The first liquid fraction has distinct properties, including being relatively low in water content, preferably less than about 8% by weight. More preferably, the first liquid fraction has a water content of less than about 4% by weight, and most preferably from about 3% to about 4% by weight. The first liquid fraction may have a syringol weight percentage in the range of, for example, between about 0%, less than about 1%, less than about 2%, less than about 3%, less than about 4%, less than about 5%, less than about 10%, less than about 15%, or less than about 20%. The weight percentage of guaiacols (i.e., methoxy phenols) in the first liquid fraction can be, for example, in the range of between 0% to 10%, including but not limited to less than about 1%, less than about 2%, less than about 3%, less than about 4%, less than about 5%, less than about 6%, less than about 7%, less than about 8%, less than about 9%, or less than about 10%. The first liquid fraction may include a phenol compound having a weight percentage in the range of 0% to 99%. For example, the phenol weight percent may be 1%, 2%, 3%, 4,%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, or 99%. In one embodiment, the first liquid fraction has furans having a weight percentage in the range of 2 to 7%, minor carbohydrates having a weight percentage in the range of 0 to less than 5%, acetic acid having a weight percentage in the range of 0 to less than 4%, levoglucosan having a weight percentage in the range of 0 to 50%, water insoluble compounds having a weight percentage in the range of 25 to 75%, and total phenolics content having a weight percentage in the range of 25-75%. Other materials present may include ketones, alcohol, and other acids.

Suitable miscellaneous oxygenates that may be present in the liquid fractions include hydroxyacetaldehyde, hydroxypropanone, and acetol.

Examples of useful ketones are 3-ethyl-2-hydroxy-2-cyclopentenone, acetoxyacetone, 2-methyl-2-cyclopentenone, 3-methyl-2-cyclopentenone, 1-hydroxy-2-butanone, 3-methyl-1,2-cyclopentanedione, 2-propanone, and 2H-Pyran-2-one.

Useful furans include 2-acetylfuran, 5-methyl-2-furaldehyde, 2-furaldehyde (furfural) (0-0.07 wt %), furantetrahydro-2,5-dimethoxy cis, furantetrahydro-2,5-dimethoxy trans, furfuryl alcohol (2-furan methanol) (0.15-0.16 wt %), 3-methyl-2(5H)-furanone (0.07-0.62 wt %), and 3-furan methanol.

Suitable phenols are phenol, o-cresol, p-cresol, m-cresol, 2-methyl-4-propylphenol, 3,4-dimethylphenol, 2,4-dimethylphenol, 2-ethylphenol, 3-ethyl phenol, hydroquinone, and 2,5-dimethylphenol.

Exemplary guaiacols are guaiacol, 4-acetoneguaiacol, 4-ethylguaiacol, 4-methylguaiacol, isoeugenol cis, isoeugenol trans, eugenol, and vanillin.

Syringols that are useful include syringol, syringaldehyde, acetosyringene, and 4-methylsyringol.

Amongst the alcohols typically present can be methanol.

Suitable acids are formic acid, propianic acid, and acetic acid.

Exemplary sugars include levoglucosan.

The second liquid fraction (SF2) (see FIG. 1) collected from crude bio-oil is very similar to the first fraction (i.e. the bio-oil condensation product composition at the second stage comprises furans having a weight percentage in the range of 2 to 7%; minor carbohydrates having a weight percentage in the range of 0 to less than 5%; acetic acid having a weight percentage in the range of 0 to less than 4%; levoglucosan having a weight percentage in the range of 5 to 15%; water insoluble compounds having a weight percentage in the range of 50 to 75%; water having a weight percentage in the range of 3 to 7%; syringols having a weight percentage in the range of 0 to less than 5%; guaiacols having a weight percentage in the range of 3 to 7%; and phenols having a weight percentage in the range of 5 to 10%). This fraction is typically recovered in an electrostatic precipitator operated in accordance with U.S. Pat. No. 8,476,480 to Brown et al., which is hereby incorporated by reference in its entirety.

The third liquid fraction (SF3) (see FIG. 1) collected from crude bio-oil is a mixture of many different components. This fraction is typically recovered in a condenser operated in accordance with U.S. Pat. No. 8,476,480 to Brown et al., which is hereby incorporated by reference in its entirety. The key to the third fraction is the high percentage of phenols. This can be anywhere from 10-18% of this fraction of bio-oil. This fraction has 5-15% water as well. The bio-oil condensation product composition at the third stage comprises furans having a weight percentage in the range of 6 to 12%; minor carbohydrates having a weight percentage in the range of 10 to 20%; acetic acid having a weight percentage in the range of 0 to less than 5%; levoglucosan having a weight percentage in the range of 0 to less than 4%; water insoluble compounds having a weight percentage in the range of 10 to 20%; water having a weight percentage in the range of 5 to 15%; syringols having a weight percentage in the range of 3 to 10%; guaiacols having a weight percentage in the range of 7 to 15%; and phenols having a weight percentage in the range of 10 to 18%.

The fourth liquid fraction (SF4) (see FIG. 1) collected from crude bio-oil is very similar to the third fraction. This fraction is typically recovered in an electrostatic precipitator operated in accordance with U.S. Pat. No. 8,476,480 to Brown et al., which is hereby incorporated by reference in its entirety. There is a high percentage of phenols and acetic acid (5-18%). This fraction can also be between 5-20% water. This fraction will collect mainly low molecular weight compounds and a low percentage of water insoluble compounds. The bio-oil condensation product composition at the fourth stage comprises furans having a weight percentage in the range of 6 to 12%; minor carbohydrates having a weight percentage in the range of 10 to 20%; acetic acid having a weight percentage in the range of 5 to 15%; levoglucosan having a weight percentage in the range of 0 to less than 4%; water insoluble compounds having a weight percentage in the range of 10 to 25%; water having a weight percentage in the range of 5 to 20%; syringols having a weight percentage in the range of 3 to 10%; guaiacols having a weight percentage in the range of 7 to 15%; and phenols having a weight percentage in the range of 10 to 18%.

The fifth liquid fraction (SF5) (see FIG. 1) collected from crude bio-oil is a watery fraction that is rich in low molecular weight compounds. This fraction is typically recovered in a condenser operated in accordance with U.S. Pat. No. 8,476,480 to Brown et al., which is hereby incorporated by reference in its entirety. This fraction contains more than 55% water and is low in water insolubles and solids (<1% each). This fraction also contains a large amount of acetic acid (5-15%). The bio-oil condensation product composition at the fifth stage comprises furans having a weight percentage in the range of 0 to less than 5%; minor carbohydrates having a weight percentage in the range of 8 to 15%; acetic acid having a weight percentage in the range of 5 to 15%; hydroxyacetaldehyde having a weight percentage in the range of 0 to less than 4%; water insoluble compounds having a weight percentage in the range of 0 to less than 1%; water having a weight percentage in the range of 56 to 90%; guaiacols having a weight percentage in the range of 0 to less than 3%; and phenols having a weight percentage in the range of 0 to less than 5%.

The heavy fractions contain mostly sugar monomers and oligomers derived from carbohydrate and phenol oligomers derived from lignin found in the biomass. The sugars are mostly water soluble while the phenolic oligomers are water insoluble. The heavy fractions are dark, viscous liquid which sometimes cools to a vitreous solid. The present invention exploits the difference in solubility between the carbohydrate and lignin-derived compounds and provides a method for washing the sugars from the insoluble fraction with flow properties superior to the original heavy fraction. The sugars can be subsequently clarified and vacuum distilled to yield "pyrolytic sugars." In one embodiment of the present invention, the phenolic oil comprises phenolic monomers, dimers, and oligomers.

Bio-oil fractions can be recovered from the pyrolysis vapor stream leaving a pyrolysis reactor by controlling the temperature of the condensing process. This produces a heavy fraction consisting of sugars/anhydrosugars and phenolic monomers and oligomers that is separately recovered from a light fraction consisting of water and low molecular weight compounds such as carboxylic acids, aldehydes, ketones, and alcohols. The lignin-derived phenolic oligomers in the heavy fraction can be separated from the sugars/anhydrosugars using a simple water extraction. Both the phenolic compounds recovered as pyrolytic lignin from whole bio-oil and from the heavy fraction of fractionating recovery of bio-oil are suitable feedstocks for production of solid fuel of the present invention (i.e., Lignocol).

The elemental composition of these liquid fractions is shown in Table 1 as follows:

TABLE 1

Elemental Compositions Analysis of the Different Fractions

| Ultimate Analysis | SF1 (Condenser) | SF2 (ESP) | SF3 (Condenser) | SF4 (ESP) | SF5 (Condenser) |
|---|---|---|---|---|---|
| Carbon | 55-65 | 55-65 | 45-60 | 40-50 | 15-25 |
| Hydrogen | 5-10 | 5-10 | 5-10 | 5-10 | 5-10 |
| Nitrogen | <1% | <1% | <1% | <1% | <1% |
| Sulfur | <1% | <1% | <1% | <1% | <1% |
| Oxygen (by difference) | 25-40 | 25-40 | 40-50 | 40-60 | 70-80 |
| Ash | <1% | <1% | <1% | <4% | <1% |
| Karl Fischer Analysis (% Moisture) | 3-7% | 3-7% | 5-15% | 5-20% | <55% |
| % Water Insolubles | 50-75% | 50-75% | 10-20% | 10-25% | <1% |
| % Solids | <3% | <3% | <1% | <1% | <1% |
| TAN (mg KOH/gram bio-oil) | 30-40 | 25-50 | 60-75 | 110-130 | 60-160 |
| Higher Heating Value (MJ/kg) | 23-26 | 23-27 | 21-24 | 19-22 | 5-10 |
| Viscosity (cSt) | 1000-2000 | 3000-6000 | 50-100 (40° C.) | 100-150 (40° C.) | 1-2 (40° C.) |

A useful system for carrying out the method of the present invention is exemplified in FIG. 1. As shown in this figure, biomass is withdrawn from the feed system and fed in to the reactor, where it is charged while fluidizing gas is provided. Exiting pyrolysis product gas passes through the cyclones. Solids removed by the cyclones are collected in containers, while vapors are withdrawn for recovery of bio-oil liquid fractions as described above. The first and second stage of the reactor (SF1 and SF2, respectively) condense ≥30-50% of the produced bio-oil and contain the largest majority of the produced phenolic compounds. These two stages also contain the lowest percentage of water of any of the stages (2.0-7.0%) derived from the biomass feedstock and formed as a by-product as a result of pyrolysis reactions.

The solid fuel of the present invention may be a low ash, low sulfur, solid fuel.

The method may also involve subjecting the carbonaceous solid to a size reduction procedure. Suitable size reduction procedures include crushing, grinding, or comminuting, and other size reduction procedures known to those skilled in the art are carbonaceous solids.

The method of the present invention may further include a subjecting step which involves mixing the bio-oil with an aqueous solution at a bio-oil to aqueous solution ratio of 1:0.4 to 1:5.0 w/w. In one embodiment, the aqueous solution is water.

The method of the present invention also comprises blending or mixing the carbonaceous solid with a solid fuel to form a fuel blend. The solid fuel can be anthracite, bituminous coal, sub-bituminous coal, lignite, peat, or wood. The fuel blend may be up to about 1 wt %, up to about 10 wt %, up to about 20 wt %, up to about 30 wt %, up to about 40 wt %, up to about 50 wt %, up to about 60 wt %, up to about 70 wt %, up to about 80 wt %, up to about 90 wt %, and up to about 99 wt %. In one embodiment, the fuel blend comprises 1-100 wt % of the carbonaceous solid.

The bio-oil provided to carry out the method of the present invention can be produced by pyrolyzing lignin-containing biomass to produce the bio-oil and recovering the bio-oil as fractions with different boiling point values, the lignin-derived fractions comprising a heavy fraction and a light fraction, wherein the heavy fraction comprises sugars and/or anhydrosugars and phenolic oil and the light fraction comprises water and low molecular weight compounds selected from the group consisting of carboxylic acids, aldehydes, ketones, and alcohols. Often, the bio-oil fractions having the highest boiling point values are subjected to the extraction procedure. In one embodiment, the heavy fraction is subjected to the extraction procedure to produce a first stream and a second stream, the first stream comprising sugars and/or anhydrosugars and the second stream comprising phenolic oil. The biomass can be in the form of forest and mill residues, agricultural crops and wastes, wood and wood wastes, grasses, manure, livestock operation residues, fast-growing trees and plants, and municipal and industrial wastes. In particular, biomass can include cellulose, hemicelluose, and/or lignin.

The pyrolyzing phase produces bio-oil vapors. These bio-oil vapors can be cooled in a first stage comprising a condenser having passages for the bio-oil vapors separated by a heat conducting wall from passages for a coolant. The coolant in the condenser of the first stage is maintained at a substantially constant temperature, set at a temperature in the range of 75 to 130° C., to condense a first liquid fraction of liquefied bio-oil constituents in the condenser of the first stage. The first liquid fraction of liquefied bio-oil constituents from the condenser of the first stage is collected. The subjecting step of the process of the present invention is carried out on the first liquid fraction.

The bio-oil vapors usually pass through the condenser of the first stage under laminar flow conditions.

When the first liquid fraction is used in carrying out the subjecting step of the present invention, it is mixed with an aqueous solution at a first liquid fraction to aqueous solution ratio of 1:0.4 to 1:5.0 w/w.

A first bio-oil vapor fraction is recovered from the condenser of the first stage, and aerosols are removed from the first bio-oil vapor fraction in a second stage as second liquid fraction of liquefied bio-oil constituents. The subjecting step of the present invention is carried out on the second liquid fraction. The removal of aerosol is carried out without further cooling the first bio-oil vapor fraction. This is often achieved with an electrostatic precipitator.

When the second liquid fraction is used to carry out the subjecting step of the present invention, it is mixed with an aqueous solution at a second liquid fraction to aqueous solution ratio of 1:1.0 to 1:2.0 w/w. The first and second liquid fractions comprise 40 to 75 wt % of the raffinate.

Alternatively, the pyrolyzing procedure produces bio-oil vapors which are cooled in a liquid scrubbing system to condense a first liquid fraction of liquefied bio-oil constituents. The first liquid fraction of liquefied bio-oil constituents is collected from the liquid scrubbing system and the subjecting step of the present invention is carried out on the first liquid fraction. The liquid scrubbing system is controlled as a function of the temperature of the bio-oil vapors entering the liquid scrubbing system.

A first bio-oil vapor fraction can be recovered from the liquid scrubbing system, and aerosols are removed from the first bio-oil vapor fraction in a second stage as second liquid fraction of liquefied bio-oil constituents. The subjecting step of the present invention is then carried out on the second liquid fraction. Removal of the aerosols is carried out without further cooling the first bio-oil vapor fraction. An electrostatic precipitator may be used to perform this step.

The extraction procedure may, in some embodiments, be carried out by contacting the bio-oil with a chilled liquid to precipitate the bio-oil in an emulsion and pouring water into the emulsion to separate the bio-oil from the emulsion. This extraction procedure can be a solvent liquefaction process.

The above disclosure generally describes the present invention. A more specific description is provided below in the following examples. The examples are described solely for the purpose of illustration and are not intended to limit the scope of the present invention. Changes in form and substitution of equivalents are contemplated as circumstances suggest or render expedient. Although specific terms have been employed herein, such terms are intended in a descriptive sense and not for purposes of limitation.

EXAMPLES

Example 1—Materials and Methods

Biomass Characterization and Reactor Configuration—Bio-oil used herein was produced by the fast pyrolysis of red oak, an example of lignin-rich biomass, although any type of lignocellulosic biomass can be used. The ultimate and proximate analyses and heating value of the red oak is given in Table 2. As-received biomass was passed through a 60 hp hammer mill equipped with a 3 mm screen to produce particles ranging from 200 μm-3 mm. The red oak particles were pyrolyzed in an 8 kg/h fluidized bed reactor fitted with a fractionating bio-oil recovery system that collects the bio-oil into distinct stage fractions (SF) according to molecular weight (FIG. 1). The reactor is described in detail by Rover et al., "Production of Clean Pyrolytic Sugars for Fermentation," *Chem Sus Chem* pp. 1662-1668 (2014), which is hereby incorporated by reference in its entirety.

TABLE 2

Ultimate and proximate analyses and higher heating values (HHV) for the red oak feedstock. Ultimate analysis is on dry basis (db) with the oxygen calculated by difference.

| Ultimate Analysis (wt % db) | | Proximate Analysis (wt %) | |
|---|---|---|---|
| Carbon | 50 ± 0.43 | Moisture | 7.1 ± 0.90 |
| Hydrogen | 4.8 ± 0.06 | Volatiles | 79 ± 0.48 |
| Nitrogen | 0.40 ± 0.00 | Fixed carbon | 13 ± 1.1 |
| Sulfur | 0.03 ± 0.004 | Ash | 0.33 ± 0.08 |
| Oxygen | 45 ± 0.49 | HHV (MJ/kg) | 19 ± 0.09 |

Figure 4:
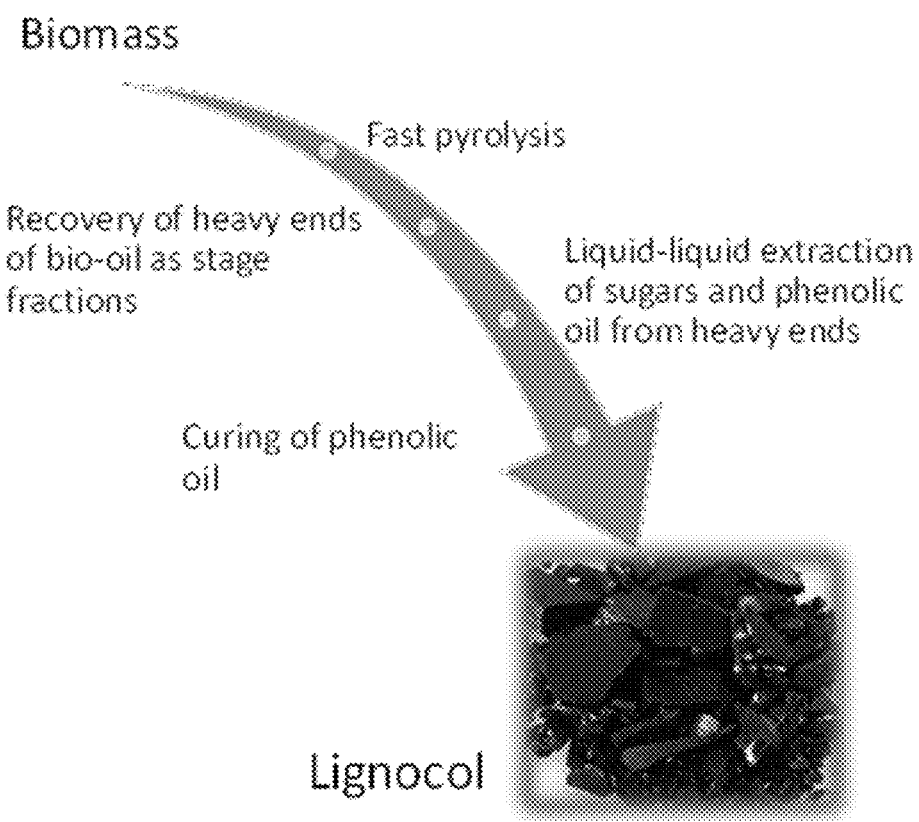
FIG. 4 shows the process for production of lignocol from lignocellulosic biomass.

The bio-oil was 60-70% of the products of fast pyrolysis of red oak. The first two stages of the reactor (SF 1 and SF 2), the heavy fractions, typically condense 40-50% of the produced bio-oil, and consist mostly of monomeric sugars and phenolic monomers, dimers and oligomers. These two fractions contain the vast majority of the lignin derived bio-oil. The middle fractions (SF 3 and SF 4) collect the monomeric materials such as phenol, condensing approximately 10% of the produced bio-oil. The light ends (SF 5 and SF 6), representing 45% of the bio-oil, collect light oxygenates (i.e. furfural, hydroxymethylfurfural, acetic acid, etc.) and the water originating from the biomass and reaction water produced during pyrolysis. On average the water content in SF 5 is 60-80 wt %. Further descriptions of the condensed fractions and the chemical constituents of the bio-oil can be found in Rover et al., "Production of Clean Pyrolytic Sugars for Fermentation," *Chem Sus Chem* pp. 1662-1668 (2014), which is hereby incorporated by reference in its entirety. The process for production of the solid fuel of the present invention (Lignocol) from lignocellulosic biomass is shown in FIG. 4.

Test Methods—Liquid-to-liquid extraction using water as the solvent is applied to separate the water-soluble material from the water-insoluble phenolic compounds. A 1:1 (w/w) mixture of water to SF 1 and SF 2 is mechanically stirred with a drill press equipped with a stainless steel open paddle for 10 to 15 min. The samples are placed on a shaker table (MaxQ 2506, Thermo Scientific®, Hanover Park, Ill.) for 30 min at 250 motions min-1 and centrifuged (accuSpin 1R, Thermo Scientific®, Hanover Park, Ill.) at 2561 g force for 30 min. The water-soluble portion is then decanted. The remaining water-insoluble fraction, referred to here as phenolic oil, is the basis for the solid fuel of the present invention (e.g., Lignocol).

To cure the liquid phenolic oil into solid Lignocol, samples ranging from several grams to 300 g were heated in a laboratory oven (IsoTemp, Thermo Scientific, Hanover Park, Ill., U.S.) to 105-220° C. for ≤2 hours. Cured samples were broken into lumped Lignocol with a hammer. Since many boilers are based on burning pulverized coal, mechanical pulverization of Lignocol was also evaluated in a ball mill at 400 rpm for 30 min with 1 min intervals between 5 min reverse rotation. The ball milled Lignocol was sieved using a 75 μm sieve to determine whether it would agglomerate, which would affect its combustion behavior in a pulverized coal boiler.

To polymerize and harden the phenolic oil, it was heat treated at 105-220° C. for ≤2 h in a laboratory oven (IsoTemp, Thermo Scientific, Hanover Park, Ill., U.S.). Lignin derived PO sample size ranged from several grams to 300 grams for the heat treatment. Grinding the heat treated PO (HTPO) was accomplished by hand, using a laboratory mortar and pestle. The pulverized HTPO was added at different ratios with high volatile C bituminous coal (power plant, Iowa State University, Ames, Iowa) sourced from coal mines in Western Kentucky and Southern Illinois (Friend, A. J., "Development of a Co-Firing Fuel from Biomass-Derived Binder and Crushed Coal," in Mechanical Engineering, Iowa State University, p. 118 (2013), which is hereby incorporated by reference in its entirety).

Moisture content of the phenolic oil bio-oil was determined by a MKS 500 Karl Fischer Moisture Titrator (Kyoto Electronics Manufacturing Co., Ltd, Kyoto, Japan) using ASTM E203 Standard Test Method for Water Using Karl Fischer Reagent. The Lignocol was weighed after curing with comparisons made to the original wt % moisture in the phenolic oil.

The proximate analysis was accomplished using thermogravimetric analysis (TGA) on a Mettler-Toledo TGA/DSC 1 STARe System. The sample size ranged from 15-25 mg. The program was set to ramp from 25° C. to 105° C. at a rate of 10° C./min and held for 40 min. The temperature was then ramped to 900° C. at a rate of 10° C./min and was held for 20 min. Nitrogen was flowed through the system at 100 mL/min. The nitrogen flow was replaced with 100 mL/min of air and the samples were held for 20 min at 900° C.

Higher heating values were determined with a Parr 6400 calorimeter (Parr Instrument Company, Moline Ill.). Benzoic acid was used as the standard. Trials were done in duplicate and standard deviation determined.

Ultimate analysis was done utilizing an Elementar, vario MICRO cube (Elementar, Hanau, Germany) elemental analyzer, with oxygen determination by difference. A minimum of three trials was performed with standard deviation calculated.

Density of Lignocol was measured by volume displacement. Ten trials were performed with standard deviation determined.

Inductively coupled plasma (ICP) was performed on the Lignocol to determine inorganic metal content using an optical emission spectrometer (OES) Optima 8000 (PerkinElmer, Shelton, Conn.). Approximately 1.0 g of the Lignocol was used for the analyses. Concentrated nitric acid (10 mL) was added to each sample and digested in an Anton Parr Microwave Reaction System (Ashland, Va.) following a modified microwave assisted pressure controlled Environmental Protection Agency (EPA) 3052 digestion method. After digestion was complete, the samples were diluted to a total volume of 100 mL with distilled water and filtered with 0.45 μm glass microfiber followed by testing. Chi et al., "Overliming Detoxification of Pyrolytic Sugar Syrup For Direct Fermentation of Levoglucosan to Ethanol," *Bioresource Technology* 150C:220-227 (2013), which is hereby incorporated by reference in its entirety.

Performance Evaluation—Since solid fuels like coal are often exposed to weather during storage, both stability and leaching tests were performed on the Lignocol. The stability tests simply consisted of soaking small lumps of Lignocol in environmental water (rain/snow) from Ames, Iowa at room temperature for 96 hours and observing any changes in their integrity. The leaching tests were performed using the Synthetic Precipitation Leaching Procedure (SPLP), which is based on ASTM D3987-85 (Annual Book of ASTM Standards, 1986, Volume 11.04, ASTM International, West Conshohocken, Pa.), which is hereby incorporated by reference in its entirety. Two distinct leaching protocol were performed: East of the Mississippi River and West of the Mississippi River. The East of the Mississippi River protocol is performed with leachate at pH 4.20±0.05 while the West of the Mississippi River protocol was performed at pH 5.00±0.05. Because surface area impacts leachability, the Lignocol was pulverized prior to testing (Table 3). After the leaching procedure, the two samples were quantified for semi-volatile organic compounds that may have leached. This was accomplished by utilizing EPA Method 8270D (40 Code of Federal Regulations (CFR) Part 136, Appendix A Method#: EPA 625) (Test America, Laboratories, Inc., Cedar Falls, Iowa), which is hereby incorporated by reference in its entirety. The list of compounds determined by 8270D are listed in Table 4.

TABLE 3

Pulverized Lignocol particle size (micron) utilized in the Synthetic Precipitation Leaching Procedure (SPLP).

| Micron | Wt % of Sample |
|---|---|
| <75 | 17.00 |
| ≥75 but <150 | 13.80 |
| ≥150 but <300 | 12.16 |
| ≥300 but <600 | 19.59 |
| ≥600 but <1200 | 37.45 |

Lignocol was combusted in a small 100 g/hour fluidized bed reactor at 650° C. to determine if it would melt in the fuel feeder or agglomerate and char in the reactor. Pulverized Lignocol was metered directly into the bed through a water-cooled auger at a rate of 100 g/h for 1 hour. Noncondensable gases leaving the condenser system were passed through a wet test meter to measure total volumetric flow rate. Concentrations of these gases were measured by micro-GC-TCD (Varian CP 4900). Complete information on the reactor and micro-GC-TCD can be found in literature by Choi (Choi et al., "Detailed Characterization of Red Oak-Derived Pyrolysis Oil: Integrated Use of GC, HPLC, IC, GPC and Karl-Fischer," *J. Anal. Appl. Pyrol.* 110:147-154 (2014) and Choi et al., "Feasibility of *Laminaria japonica* as a Feedstock for Fast Pyrolysis in Bubbling Fluidized-Bed Reactor," *J. Anal. Appl. Pyrol.* 112:401-402 (2015), both of which are hereby incorporated by reference in their entirety).

TABLE 4

List of compounds determined by EPA Method 8270D.
Analytes

| | | |
|---|---|---|
| 1,2,4,5-tetrachlorbenzene | 4-bromophenyl phenyl ether | fluoranthene |
| 1,2,4-trichlorobenzene | 4-chloro-3-methlphenol | fluorine |
| 1,2-dichlorobenzene | 4-chloroaniline | hexachlorobenzene |
| 1,2-diphenylhydrazine | 4-chlorophenyl phenyl ether | hexachlorobutadiene |
| 1,3,5-trinitrobenzene | 4-methylphenol (p-cresol) | hexachlorocyclopentadiene |
| 1,3-dichlorobenzene | and/or 3-methylphenol (m-cresol) | hexachloroethane |
| 1,3-dinitrobenzene | | hexachloropropene |
| 1,4-dichlorobenzene | 4-nitroaniline | indeno (1,2,3-cd) pyrene |
| 1,4-dioxane | 4-nitrophenol | isodrin |
| 1,4-napthoquinone | 5-nitro-o-toluidine | isophorone |
| 1,4-phenylenediamine | 7,12-dimethylbenz (a) anthracene | isosafrole |
| 1-methylnaphthalene | | kepone |
| 1-napthylamine | a,a-dimethyphenethylamine | methapyrilene |
| 2,3,4,6-tetrachlorophenol | acenaphthene | methyl methanesulfonate |
| 2,4,5-trichlorophenol | acenaphthylene | naphthalene |
| 2,4,6-trichlorophenol | acetophenone | nitrobenzene |
| 2,4-dichlorophenol | aniline | N-nitrosodiethylamine |
| 2,4-dimethylphenol | anthracene | N-nitrosodimethylamine |
| 2,4-dinitrophenol | benzidine | N-nitrosodi-n-butylamine |
| 2,5-dinitrophenol | benzo (a) anthracene | N-nitrosodi-n-propylamine |
| 2,6-dichlorophenol | benzo (a)pyrene | N-nitrosodiphenylamine |
| 2,4-dimethylphenol | benzo (b) fluoranthene | N-nitrosomethylethylamine |
| 2,4-dinitrophenol | benzo (g,h,i) perylene | N-nitrosopiperidine |
| 2,4-dinitrotoluene | benzo (k) fluoranthene | N-nitrosopyrrolidine |
| 2,5-dinitrophenol | benzoic acid | o,o,o-triethyl phosphorothioate |
| 2,6-dichlorophenol | benzyl alcohol | o-toluidine |
| 2,6-dinitrotoluene | (bis (2-chloroethoxy)methane | p-(dimethylamino)azobenzene |
| 2,5-dinitrophenol | bis (2-chloroethyl)ether | parathion-ethyl |
| 2,6-dichlorophenol | bis (chloroisopropyl)ether | parathion-methyl |

TABLE 4-continued

List of compounds determined by EPA Method 8270D.
Analytes

| | | |
|---|---|---|
| 2,6-dinitrotoluene | bis (2-ethylhexyl) phthalate | pentachlorobenzene |
| 2-acetylaminofluorene | butyl benzyl phthalate | pentachloroethane |
| 2-chloronaphthalene | carbazole | pentachloronitrobenzene |
| 2-chlorophenol | chlorobenzilate | pentachlorophenol |
| 2-methylnaphthalene | chrysene | phenacetin |
| 2-methylphenol (o-cresol) | diallate (cis or trans) | phenanthrene |
| 2-naphthylamine | dibenzo (a,h) anthracene | phenol |
| 2-nitroaniline | dibenzofuran | phorate |
| 2-nitrophenol | diethyl phthalate | pronamide |
| 3,3'-dichlorobenzidine | dimethoate | pyrene |
| 3,3'-dimethylbenzidine | dimethylphthalate | pyridine |
| 3-methylcholanthrene | di-n-butyl phthalate | safrole |
| 3-nitroaniline | din-octyl phthalate | thionazin |
| 4,6-dinitro-2-methylphenol | dinoseb | |
| 4-aminobiphenyl | diphenylamine | |
| | disulfoton | |
| | ethyl methanesulfonate | |
| | famphur | |

Example 2—Results and Discussion

During Heat Treated Phenolic Oil ("HTPO") development; SF 1 was utilized after the water-soluble constituents were removed using liquid-liquid extraction with water. The PO was blended with coal at various ratios (by weight) after pulverizing the coal to consistent size. The SF 1 PO was blended with coal at 35:65, 40:60, 45:55, 50:50, 60:40, 100:0, and 0:100 ratios of SF 1 PO:coal (Table 5). These blends were then heat treated (cured) at different temperatures; 105° C. for 1 h and 45 min, 150° C. for 2 h, ramping to 200° C. over a 2 h period, and 220° C. for 2 hours. Curing worked well at the various temperatures.

Table 5 indicates that blends and the 100% SF 1 PO did not affect the higher heating values (HHV); the blends, the 100% SF 1 PO, and the 100% coal had comparable HHVs. The weight loss during the curing depends on the temperature and time. Curing times and temperatures will be optimized according to the produced oil. The moisture in the SF 1 POs ranged from 19.064 to 20.825 wt %. As shown, the large majority of weight loss is water. The water in heavy-ends oil results from the 1:1 water wash to remove the water-soluble constituents prior to blending and curing the resulting PO. The chunks of HTPO (FIG. 2A) were pulverized into a fine grind (FIG. 2B), by hand, using a laboratory mortar and pestle.

TABLE 5

Higher heating values (HHV) for various blends of SF1 pulverized heat treated phenolic oil (HTPO) and coal and weight loss during curing.

| Ratio of HTPO:Coal (by weight) | HHV (MJ/Kg) | HHV (Btu/lb) | Weight loss during curing (wt %) |
|---|---|---|---|
| 35:65 | 28.6725 | 12,327 | N/A |
| 40:60 | 28.7393 | 12,356 | 18.4 |
| 45:55 | 29.3121 | 12,602 | N/A |
| 50:50 | 29.5220 | 12,692 | 21.0 |
| 60:40 | 28.2152 | 12,130 | 23.1 |
| 100:0 | 28.5251 | 12,264 | 33.56 |
| 0:100 | 29.9539 | 12,878 | N/A |

The proximate analysis indicates that the loss of moisture and light volatiles during curing leads to higher concentrations of fixed carbon in the fuel (Table 6). Also shown is the low ash content in the HTPO.

TABLE 6

Proximate analysis comparison of the heavy fractions stage fraction (SF) 1 phenolic oil (PO) (that had the water-soluble compounds (includes sugars) removed with a 1:1 by weight ratio of water to SF1 oil) and the pulverized heat treated phenolic oil (HTPO).

| Sample | Moisture (volatiles from 25-105° C.) | Volatiles (105-900° C.) | Fixed Carbon (900° C. with air) | Ash |
|---|---|---|---|---|
| SF 1 PO* | 2.464 | 70.39 | 26.40 | 0.738 |
| HTPO | 0.7156 | 65.38 | 33.41 | 0.4712 |

*SF 1 PO was heated for 30 minutes at 105° C. to remove water in order to give a comparable baseline with HTPO.

Ultimate analysis shows that the percentages of carbon, hydrogen, nitrogen, sulfur, and oxygen do not change during the curing (Table 7). This is evidence that the HTPO is polymerizing and not coking during the curing process. It also indicates that HTPO contains high percentages of carbon and low nitrogen and sulfur percentages. This could benefit co-firing with coal to reduce emissions.

TABLE 7

Ultimate analysis comparison on a dry basis (db) of heavy fractions SF 1 phenolic oil (PO) (that had the water-soluble compounds (includes sugars) removed with a 1:1 by weight ratio of water to SF1 oil) and pulverized heat treated phenolic oil (HTPO).

| Sample | Carbon (wt % db) | Hydrogen (wt % db) | Nitrogen (wt % db) | Sulfur (wt % db) | Oxygen by difference (wt % db) |
|---|---|---|---|---|---|
| SF 1 PO | 72.47 | 3.93 | 0.284 | 0.0124 | 23.30 |
| HTPO | 71.36 | 5.29 | 0.263 | 0.0183 | 23.07 |

A bench top reactor was utilized to simulate coal-fired boiler systems. During the combustion of the pulverized HTPO in the 100 g/h reactor, it ran smoothly and the feeder system ran efficiently with no agglomeration in the auger. Evidence of this is shown by the reactor not experiencing any pressure drops, an indication that there was no agglomeration within the system. However, small amounts of noncondensable gas formed (hydrogen, methane, and ethylene). This suggests that the reactor needed to be run at higher temperatures. The temperature required to combust coal is 800° C. which was not within the capabilities of the reactor. Future plans include collaborations with a coal burning facility in which the pulverized HTPO will be co-fed with the existing coal utilized by the facility.

The heating values, moisture, ash, sulfur, and nitrogen values were compared to the majority of current United States coal sources (Table 8) (E.I. Administration, Coal Data: A Reference, in: U.S.D.o.E.E.I. Administration (Ed.), Washington, D.C., 1995, pp. 1-132, which is hereby incorporated by reference in its entirety). As shown, the pulverized HTPO had much lower moisture, ash, sulfur, and nitrogen values versus that of common coal. The calorific value is very similar to the majority. The low-volatile bituminous (West Virginia), medium-volatile bituminous (Pennsylvania), and the high-volatile A bituminous (West Virginia) contained higher Btu/lb by approximately 2000 Btu/lb.

TABLE 8

Comparison of heating values, moisture, ash, sulfur, and nitrogen of the pulverized heat treated phenolic oil (HTPO) with the majority of current United States coal sources (E.I. Administration, Coal Data: A Reference, in: U.S.D.o.E.E.I. Administration (Ed.), Washington, DC, 1995, pp. 1-132, which is hereby incorporated by reference in its entirety).

| Fuel type | Moisture (wt %) | Ash (wt %) | Sulfur (wt %) | Nitrogen (wt %) | Calorific value (Btu/lb) |
| --- | --- | --- | --- | --- | --- |
| Anthracite (Pennsylvania) | 4.3 | 9.6 | 0.8 | 0.9 | 12,880 |
| Low-volatile Bituminous (West Virginia) | 2.6 | 5.4 | 0.8 | 1.3 | 14,400 |
| Medium-volatile Bituminous (Pennsylvania) | 2.1 | 6.1 | 1.0 | 1.4 | 14,310 |
| High-volatile A Bituminous (West Virginia) | 2.3 | 5.2 | 0.8 | 1.6 | 14,040 |
| High-volatile B Bituminous (Kentucky) | 8.5 | 10.8 | 2.8 | 1.3 | 11,680 |
| High-volatile C Bituminous (Illinois) | 14.4 | 9.6 | 3.8 | 1.0 | 10,810 |
| Subbituminous A (Wyoming) | 16.9 | 3.6 | 1.4 | 1.2 | 10,650 |
| Subbituminous B (Wyoming) | 22.2 | 4.3 | 0.5 | 1.0 | 9,610 |
| Subbituminous C (Wyoming) | 26.6 | 5.8 | 0.6 | 0.9 | 8,630 |
| Lignite (North Dakota) | 36.8 | 5.9 | 0.9 | 0.6 | 7,000 |
| HTPO | 0.72 | 0.47 | 0.01 | 0.3 | 12,264 |

Note:
coal analyses is "as received"

Figure 3:
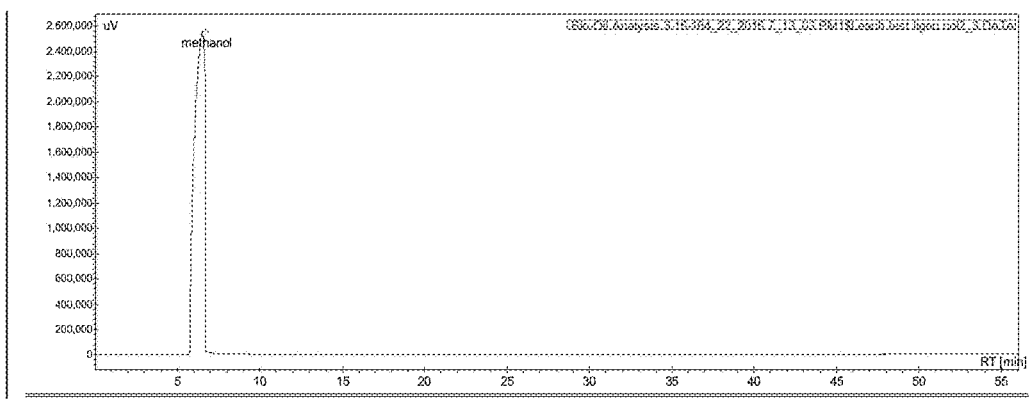
FIG. 3 shows a chromatogram of the heat treated phenolic oil (HTPO) after subjecting it to leach test environmental conditions mimicking standing water.

The HTPO was subjected to a leach test to mimic environmental conditions of standing water. The sample of HTPO showed no signs of structure degradation after four days when the water was removed. The chromatogram indicated that compounds did not leach out of the sample when the HTPO was subjected to standing water (FIG. 3). Weathering conditions did not appear to influence the sample in regards to hardness and/or leaching of phenolic compounds.

As shown in Table 9 and FIG. 3, the inorganics tested in the HTPO are much less than those shown in the coal samples. The only exception was Zn. The HTPO contained 20.2±7.87 ppm, whereas the coal sample gathered from a variety of places contained 11 ppm.

TABLE 9

Inorganic element analysis by ICP of pulverized lignin heat treated phenolic oil (HTPO) in comparison to coal samples gathered from a variety of places.

| Inorganic Element | HTPO (ppm) | Coal (ppm)* |
| --- | --- | --- |
| Al | 46.3 ± 4.85 | 22,000 |
| Ca | 55.3 ± 8.65 | 38,000 |
| Cu | 1.27 ± 2.25 | 12 |
| Fe | 36.2 ± 2.58 | 7,800 |
| Mg | 7.04 ± 0.78 | 270 |
| Mn | 3.83 ± 0.10 | 35 |
| P | 3.54 ± 0.15 | 900 |
| S | 115 ± 4.41 | 1,500 |
| Zn | 20.2 ± 7.87 | 11 |
| Na | 186 ± 17.7 | 450 |
| K | 73.9 ± 11.6 | 3,400 |

*E.I. Administration, Coal Data: A Reference, in: U.S.D.E.E.I. Administration (Ed.), Washington, DC, pp. 1-132 (1995), which is hereby incorporated by reference in its entirety.

These examples present alternatives to using coal/wood pellets as energy sources by utilizing heat treated water-insoluble phenolic oil derived from fast pyrolysis. These results indicate the HTPO bio-oil can be used to replace coal at 100% or co-fired with coal utilizing the existing coal materials, handling and processing infrastructure. The HHV were comparable to many common U.S. coals while maintaining very low metal content, low nitrogen, and low sulfur. When subjected to environmental conditions in the Ames, Iowa area, the HTPO maintained its hardened structure and did not leach phenolic components. The HTPO was fed continuously into a bench scale reactor with no agglomerations or reactor problems.

Figure 2:
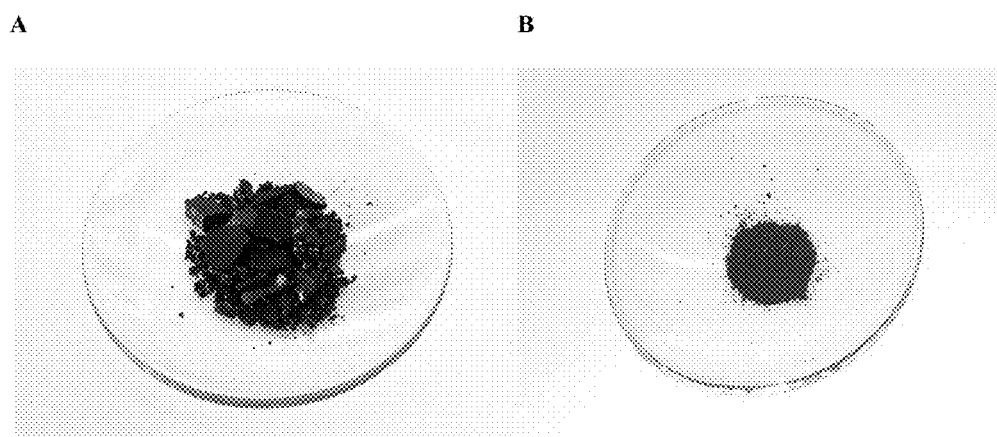
FIGS. 2A-B show lignocol from curing pyrolysis-derived phenolic oil lumped (FIG. 2A) and after pulverizing (FIG. 2B).

Lignocol Physical Characteristics—The phenolic oil cured to a hard, vitreous solid. It was easily cracked into lumps with a hammer, as shown in FIG. 2A. Although not sticky to the touch, the lumped Lignocol was pulverized in a ball mill to see if this thermomechanical process caused it to melt. In fact, an unconsolidated powder was formed (see FIG. 2B) that readily passed through a 75 micron sieve, suggesting its suitability as pulverized boiler fuel.

Lignocol Comparisons to Coal—Proximate analysis was performed on the pulverized sample utilizing TGA and compared to a wide range of commercially significant coals in Table 10. The low moisture content of 0.72 wt % is the result of the evaporation of water from the phenolic oil during its curing to solid fuel. In contrast, coals contain between 5-37 wt % moisture, which can dramatically raise the dew point in flue gas and correspondingly drop the effective heating value of the fuel. The volatile content of Lignocol was 65 wt %, much higher than coal, which ranges from 5-36 wt %. Volatiles play an important role in ignition, flame stabilization, and pollutant formation during combustion. Generally, higher volatile content is expected to improve combustion efficiency and reduce nitrogen oxide emissions, but whether Lignocol provides these combustion benefits was beyond the scope of this study. Fixed carbon was 33 wt %, near the bottom of the 30-81 wt % range for coals. The ash content of the Lignocol is not significantly different from the ash content of the biomass from which it is produced. On the other hand, the ash content of Lignocol is only 0.47 wt %, extremely low compared to most coals, which range from 5-10 wt %. Accordingly, cofiring Lignocol substantially reduces the volume of ash that must be removed and disposed from a coal boiler.

The HHV of Lignocol is compared to various coals in Table 10. At 29 MJ/kg, Lignocol's HHV is 52.6% higher than for the biomass from which it was produced. It is also higher than all the coals considered in Table 10 with the exception of anthracite coal and a few bituminous coals from the Eastern United States. As subsequently illustrated, the enhanced heating value of Lignocol compared to biomass from which it is produced reflects its relatively low oxygen content compared to the biomass. Although fast pyrolysis does not deoxygenate biomass-derived molecules, Lignocol is formed from the lignin fraction of biomass, which is much lower in oxygen content than the carbohydrate fraction.

TABLE 10

Proximate analysis and higher heating values (HHV) of red oak, pulverized Lignocol produced from red oak and several U.S. coals

| Fuel Type | Moisture (wt %) | Volatiles (wt %) | Fixed carbon (wt %) | Ash (wt %) | HHV (MJ/kg) |
| --- | --- | --- | --- | --- | --- |
| Red oak | 7.1 ± 0.90 | 79 ± 0.48 | 13 ± 1.1 | 0.33 ± 0.08 | 19 ± 0.09 |
| Lignocol | 0.72 ± 0.30 | 65 ± 1.3 | 33 ± 1.3 | 0.47 ± 0.28 | 29 ± 0.01 |
| Anthracite (Pennsylvania) | 4.3 | 5.1 | 81.0 | 9.6 | 30 |
| Low-volatile Bituminous (West Virginia) | 2.9 | 18 | 74 | 5.4 | 34 |
| Medium-volatile Bituminous (Pennsylvania) | 2.1 | 24 | 67 | 6.1 | 33 |
| High-volatile A Bituminous (West Virginia) | 2.3 | 37 | 56 | 5.2 | 33 |
| High-volatile B Bituminous (Kentucky) | 8.5 | 36 | 44 | 11 | 27 |
| High-volatile C Bituminous (Illinois) | 14 | 35 | 41 | 9.6 | 25 |
| Subbituminous A (Wyoming) | 17 | 35 | 45 | 3.6 | 25 |
| Subbituminous B (Wyoming) | 22 | 33 | 40 | 4.3 | 22 |
| Subbituminous C (Wyoming) | 27 | 33 | 34 | 5.8 | 20 |
| Lignite (North Dakota) | 37 | 28 | 30 | 5.9 | 16 |

(*E.I. Administration, Coal Data: A Reference, in: U.S.D.E.E.I. Administration (Ed.), Washington, DC, pp. 1-132 (1995), which is hereby incorporated by reference in its entirety).

The ultimate analysis, which is important in determining the air requirement for their combustion as well as for predicting nitrogen and sulfur oxide emissions, for uncured phenolic oil and Lignocol is compared to common U.S. coals in Table 11. The ultimate analysis of the phenolic oil does not substantially change in curing it to form Lignocol, which indicates that the phenolic oil did not chemically dehydrate during curing. Although Lignocol has less oxygen than the biomass from which it formed (23 wt % dry basis (db) vs 45 wt % db), it has more oxygen than the coals with which it is compared (2-20 wt %). On the other hand, sulfur and nitrogen (0.02 wt % db and 0.26 wt % db, respectively) are much lower than found in coal (0.8-4.4 wt % and 0.9-1.6 wt %, respectively). Accordingly, Lignocol is expected to substantially reduce sulfur and nitrogen emissions when co-fired with coal.

Lignocol percentages of carbon, hydrogen, nitrogen, sulfur, and oxygen showed only slight changes during the curing process. This provides support that the Lignocol did not substantially change in chemical composition during the curing process.

Density (by water displacement) of Lignocol was measured at 1186±34.4 kg/m3. Particle density for coal, on average, is 1300 kg/m3, (W. D. Robinson, The Solid Waste Handbook: A Practical Guide, New York: Wiley, N.Y. (1986), which is hereby incorporated by reference in its entirety) whereas, Powder River Basin Wyoming coal has an average density of 1300-1900 kg/m3 (Luppens et al., "Coal Geology and Assessment of Coal Resources and Reserves in the Powder River Basin, Wyoming and Montana," in: U.S.G. Survey (Ed.), U.S. Geological Survey, pp. 1-220, which is hereby incorporated by reference in its entirety). Mahajan (Mahajan et al., Chapter 4—Porosity of Coals and Coal Products A2—KARR, CLARENCE, in: Analytical Methods for Coal and Coal Products, Academic Press, pp. 125-162 (1978), which is hereby incorporated by reference in its entirety) described coal densities of eight 40×70-mesh coals determined by water displacement. These densities ranged from 1371-1648 kg/m3 for coals containing 70.9-89.5 wt % carbon on db. Lignocol has a slightly lower density than coal on average but its density is much higher than the biomass from which it was produced.

Accordingly, bulk density of comparably sized lumped Lignocol and coal will be similar, which should allow them to be blended for storage, conveyance, and feeding into boilers.

TABLE 11

Ultimate analysis on dry basis (db) of red oak, stage fraction (SF) 1 phenolic oil (PO) from red oak and Lignocol phenolic oil compared to several U.S. coals (E.I. Administration, Coal Data: A Reference, in: U.S.D.E.E.I. Administration (Ed.), Washington, DC, pp. 1-132 (1995), which is hereby incorporated by reference in its entirety).

| Fuel Type | Carbon (wt % db) | Hydrogen (wt % db) | Nitrogen (wt % db) | Sulfur (wt % db) | Oxygen (wt % db) |
|---|---|---|---|---|---|
| Red oak | 50 ± 0.43 | 4.8 ± 0.06 | 0.40 ± 0.00 | 0.03 ± 0.02 | 45 ± 0.49 |
| Phenolic oil from pyrolysis of red oak | 73 ± 0.72 | 3.93 ± 0.21 | 0.28 ± 0.03 | 0.02 ± 0.01 | 23 ± 0.75 |
| Lignocol from curing red oak phenolic oil | 71 ± 4.5 | 5.3 ± 0.21 | 0.26 ± 0.03 | 0.02 ± 0.01 | 23 ± 4.7 |
| Anthracite (Pennsylvania) | 83 | 2.5 | 0.9 | 0.8 | 2.4 |
| Low-volatile Bituminous (West Virginia) | 86 | 4.4 | 1.3 | 0.8 | 2.3 |
| Medium-volatile Bituminous (Pennsylvania) | 83 | 4.8 | 1.5 | 1.1 | 3.0 |
| High-volatile A Bituminous (West Virginia) | 80 | 5.4 | 1.6 | 0.8 | 6.6 |
| High-volatile B Bituminous (Kentucky) | 71 | 4.9 | 1.5 | 3.0 | 7.7 |
| High-volatile C Bituminous (Illinois) | 70 | 4.9 | 1.2 | 4.4 | 8.5 |
| Subbituminous A (Wyoming) | 73 | 4.9 | 1.5 | 1.7 | 15 |
| Subbituminotis B (Wyoming) | 69 | 5.6 | 1.2 | 0.6 | 18 |
| Subbituminous C (Wyoming) | 68 | 4.8 | 1.2 | 0.8 | 18 |
| Lignite (North Dakota) | 64 | 4.5 | 1.0 | 1.4 | 19 |

The trace element analysis of Lignocol, as determined by ICP, is compared to several coals in Table 12. The trace element content of Lignocol is much lower than for coal, often several orders of magnitude lower. The exception was zinc, which was a factor of two higher in Lignocol for most of the coals except for the Iowa coal. Interestingly, alkali metals (Na and K), which are implicated in ash fouling of biomass fuels, is much lower in the Lignocol compared to the coals shown in Table 12. Although ash fouling was not explicitly investigated, the low alkali content of this red oak-derived solid fuel on a heating value basis (9×10-3 kg/GJ) is well below the maximum recommended content for co-firing biomass (0.17-0.34 kg/GJ) (Brown et al., "Biorenewable Resources: Engineering New Products from Agriculture," 2nd Edition, Second ed., John Wiley & Sons, Inc., 2014), which is hereby incorporated by reference in its entirety).

TABLE 12

Trace element analysis by ICP of Lignocol compared to coal samples from Wyoming, Pennsylvania, Illinois, and Iowa.

| Trace Element | Lignocol | Powder River Basin, Wyoming [17] | Pennsylvanian C bituminous [18] | Illinois high volatile B bituminous [19] | Iowa High volatile C bituminous [19] |
|---|---|---|---|---|---|
| Al (ppm) | 46.3 ± 4.85 | 4,000-5,000 | 22,000 | 9,490 | 4,420 |
| Ca (ppm) | 55.3 ± 8.65 | 4,900-8,900 | 38,000 | 1,960 | 15,800 |
| Cu (ppm) | 1.27 ± 2.25 | 9.4-9.6 | 12.0 | 19.9 | 14 |
| Fe (ppm) | 36.2 ± 2.58 | 1,800-2,400 | 7,800 | 12,000 | 41,800 |
| Mg (ppm) | 7.04 ± 0.78 | 1,200-1,800 | 270 | 382 | 226 |
| Mn (ppm) | 3.83 ± 0.10 | 8.1-14 | 35.0 | 25.8 | 128 |
| P (ppm) | 3.54 ± 0.15 | <58-230 | — | 14.5 | 750 |
| S (ppm) | 115 ± 4.41 | — | 1,500 | 29,000 | 57,000 |
| Zn (ppm) | 20.2 ± 7.87 | 4.9-14 | 11.0 | 9.97 | 4,390 |
| Na (ppm) | 186 ± 17.7 | — | 450 | 623 | 278 |
| K (ppm) | 73.9 ± 11.6 | 92-160 | 3,400 | 1,110 | 327 |

[17] refers to Stricker et al., "Coal Quality and Major, Minor, and Trace Elements in the Powder River, Green River, and Williston Basins, Wyoming and North Dakota," in: U.S.D.I.U.S.G. Survey (Ed.), U.S. Geological Survey, Reston, Virginia (2007), which is hereby incorporated by reference in its entirety.

[18] refers to Schweinfurth, P., "Coal-A Complex Natural Resource,"in: U.S.G. Survey (Ed.) An Overview of Factors Affecting Coal Quality and Use in the United States" (accessed Mar. 24, 2016), which is hereby incorporated by reference in its entirety.

[19] refers to Palmer et al., The U.S. Geological Survey Coal Quality (COALQUAL) Database in: U.S.G. Survey (Ed.) (2015), which is hereby incorporated by reference in its entirety.

Lumped Lignocol showed no structural degradation when soaked in water even after 96 hours. In the leaching tests only a few aromatic compounds were detected in the leachate at very low levels (1-3 ppm), as shown in Table 13. The East of the Mississippi River protocol found 8.52 ppm aromatic compounds leached while the West of the Mississippi River protocol produced 9.03 ppm aromatic compounds. Phenolics, being weak acids, require basic solutions to effectively extract them. Accordingly, the less acidic solution of the West of Mississippi River protocol leached slightly more phenolics.

TABLE 13

Quantification of semi-volatile organic compounds by GC/MS after completion of Synthetic Precipitation Leaching Procedure (SPLP) and analysis using EPA Method 8270D.

| Compound | East of Mississippi River (ppm) | West of Mississippi River (ppm) |
|---|---|---|
| carbazole | 1.22 | 1.20 |
| 2,4-dimethylphenol | 1.33 | 1.39 |
| 2-methylphenol | 1.49 | 1.63 |
| 4-methylphenol and/or 3-methylphenol | 3.02 | 3.23 |
| phenol | 1.46 | 1.58 |
| All other compounds | below reporting limit* | below reporting limit* |

*The reporting limit for the listed organics in EPA Method 8270D was 0.700 ppm except for: benzidine (6.70 ppm) 3,3'-dichlorobenzidine (3.30 ppm), hexachlorocyclo-pentadiene (1.30 ppm), di-n-octyl phthalate (1.30 ppm), benzoic acid (6.70 ppm), and 2,4-dinitrophenol (1.30 ppm). Refer to Materials and Methods section for complete listing of all chemicals tested. Combustion tests on pulverized Lignocol were performed in a 100 g/h fluidized bed operated at 650° C. The Lignocol fed smoothly with no evidence of melting or blockage in the feed auger. The reactor ran smoothly for the duration of the 1 hour test, free of pressure fluctuations associated with the formation of agglomerates in fluidized beds. Visual inspection of the reactor after the test found no agglomerates. Trace amounts of hydrogen and light hydrocarbons were detected in the flue gas, evidence of incomplete combustion. Solid fuels are typically combusted in fluidized beds at higher temperatures than could be achieved in this reactor to assure complete combustion. Nevertheless, these preliminary combustion tests are promising.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A method of producing a solid fuel, said method comprising:
   providing a bio-oil;
   subjecting the bio-oil to an extraction procedure with an aqueous solution to produce a concentrated pyrolytic sugar-containing extract and a water insoluble raffinate comprising a lignin-derived phenolic oil; and
   thermally curing the phenolic oil to form a carbonaceous solid.

2. The method of claim 1, wherein the phenolic oil comprises phenolic monomers and oligomers.

3. The method of claim 1 further comprising:
   subjecting the carbonaceous solid to a size reduction procedure.

4. The method of claim 3, wherein the size reduction procedure is selected from the group consisting of crushing, grinding, and comminuting.

5. The method of claim 1, wherein said subjecting comprises:
   mixing the lignin-derived phenolic oil with an aqueous solution at a lignin-derived phenolic oil to aqueous solution ratio of 1:0.4 to 1:5.0 w/w.

6. The method of claim 1, wherein said providing comprises:
   pyrolyzing lignin-containing biomass to produce the bio-oil and
   recovering the bio-oil as lignin-derived fractions with different boiling point values, the lignin-derived fractions comprising a heavy fraction and a light fraction, wherein the heavy fraction comprises sugars and/or anhydrosugars and phenolic oil and the light fraction comprises water and low molecular weight compounds selected from the group consisting of carboxylic acids, aldehydes, ketones, and alcohols.

7. The method of claim 6, wherein the heavy fraction is subjected to the extraction procedure to produce a first stream and a second stream, the first stream comprising sugars and/or anhydrosugars and the second stream comprising phenolic oil.

8. The method of claim 6, wherein the biomass is selected from the group consisting of forest and mill residues, agricultural crops and wastes, wood and wood wastes, grasses, manure, livestock operation residues, fast-growing trees and plants, and municipal and industrial wastes.

9. The method of claim 6, said pyrolyzing produces bio-oil vapors and said method further comprises:
   cooling the bio-oil vapors in a first stage comprising a condenser having passages for the bio-oil vapors separated by a heat conducting wall from passages for a coolant, wherein the coolant in the condenser of the first stage is maintained at a substantially constant temperature, set at a temperature in the range of 75 to 130° C., to condense a first liquid fraction of liquefied bio-oil constituents in the condenser of the first stage;
   collecting the first liquid fraction of liquefied bio-oil constituents from the condenser of the first stage; and
   carrying out said subjecting on the first liquid fraction.

10. The method of claim 9, wherein the first liquid fraction comprises:
    furans having a weight percentage in the range of 2 to 7%, minor carbohydrates having a weight percentage in the range of 0 to less than 5%, acetic acid having a weight percentage in the range of 0 to less than 4%, levoglucosan having a weight percentage in the range of 0 to 50%, water insoluble compounds having a weight percentage in the range of 25 to 75%, and total phenolics having a weight percentage in the range of 25-75%.

11. The method of claim 9, wherein the bio-oil vapors pass through the condenser of the first stage under laminar flow conditions.

12. The method of claim 9, wherein said subjecting comprises:
    mixing the first liquid fraction with an aqueous solution at a first liquid fraction to aqueous solution ratio of 1:0.4 to 1:5.0 w/w.

13. The method of claim 1, wherein said thermal curing is carried out at 105-220° C. for less than 3 hours.

14. The method of claim 1, wherein the extraction procedure further comprises:
    contacting the bio-oil with a chilled liquid to precipitate the bio-oil in an emulsion and
    pouring water into the emulsion to separate the bio-oil from the emulsion.

15. The method of claim 14, wherein the extraction procedure is a solvent liquefaction process.

* * * * *